Nov. 13, 1928.

H. K. PORTER 1,691,303

JOURNAL BOX

Filed April 3, 1925

INVENTOR:
HOWARD K. PORTER
By [signature]
HIS ATTORNEY.

Patented Nov. 13, 1928.

1,691,303

UNITED STATES PATENT OFFICE.

HOWARD K. PORTER, OF RIDGEWOOD, NEW JERSEY, ASSIGNOR TO GENERAL MOTORS CORPORATION, OF DETROIT, MICHIGAN, A CORPORATION OF DELAWARE.

JOURNAL BOX.

Application filed April 3, 1925. Serial No. 20,495.

This invention relates to journal boxes and is herein shown as embodied in a lubricating journal box for a mine car.

An object of the invention is to provide a journal box having means for effecting a continuous and gradual supply of grease to thrust surfaces and to provide more adequate lubrication with consequent increase in the period which a given supply will last. Another object is to provide a journal box of this character which can be efficiently used in cooperation with a large variety of car wheels.

To these ends and also to improve generally upon devices of the character indicated my invention consists in the various matters hereinafter described and claimed.

Referring to the drawings, Figure 1 is a vertical section.

Figure 4:
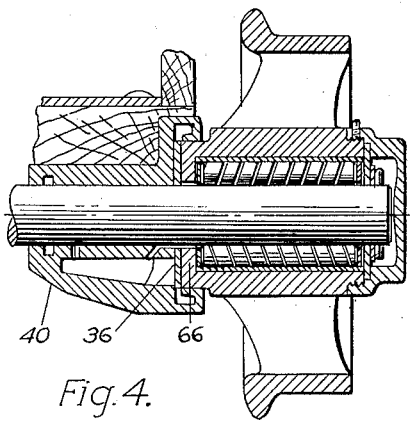
Figures 4 and 5 are vertical sections, to smaller scale, showing the journal box used in conjunction with other types of wheels.

The numeral 10 indicates a car wheel having a hub 12 which is bored to receive a lining 14 for a roller bearing 16 running on an axle 18. The axle passes through an integral end plate 20 of the hub and a pin 22 holds the wheel on the axle. The roller bearing has the usual cage with end rings 24 and the bearing and its lining are retained in the hub by a thick washer 26 pressed into the bore of the hub and having a clearance with the axle to allow lubricant to pass. The lining has openings 28 and the hub has an annular recess 30 communicating with a passage 32 into which lubricant may be introduced by removing a threaded plug 34 and applying a grease gun. The face of the washer 26 and the inner end of the hub form a thrust surface cooperating with one side of a thrust washer 36 which loosely surrounds and has a clearance with the shaft between the hub and the outer thrust face 38 of a journal box 40.

The journal box has side extensions 42 by which it is bolted to the car body indicated generally at 44. The box has an extension 46 surrounding the inner end of the hub and making a close joint therewith at 48. Comparatively stiff grease is placed in an annular chamber 50 formed in the extension 46 and closes the joint. The grease introduced through the plug 34 is preferably of about the consistency of vaseline and its escape along the axle is barred as by a felt ring 52.

A lubricant reservoir 54 is formed in the lower part of the box at the side of its thrust face 38 and ports 56 lead from a space 58 at the underside of the axle to the reservoir. When forcing the grease into the reservoir, air can escape through a port 60 and this port will also allow any grease that subsequently works along the axle to drop back into the reservoir. Passages 62, forming in effect a part of the reservoir, lead to the end of the box and to the thrust washer 36. Inasmuch as the thrust washer is loose on the axle, it is free to rotate with the wheel. Openings or notches 64 are formed in the washer so that rotation of the washer will lift lubricant supplied from the passages 62 and give it access to the thrust faces on both sides of the washer. It also supplies lubricant to the bearing faces of the journal box and axle and returns some to the roller bearings. A gradual supply of lubricant and a circulation are thus attained and, as escape is prevented, one supply will last for a long period and there will be no waste. A series of abutting washers similar to 36 may be used if desired and the reservoir may have a threaded plug 65 to receive lubricant directly.

Figure 5:
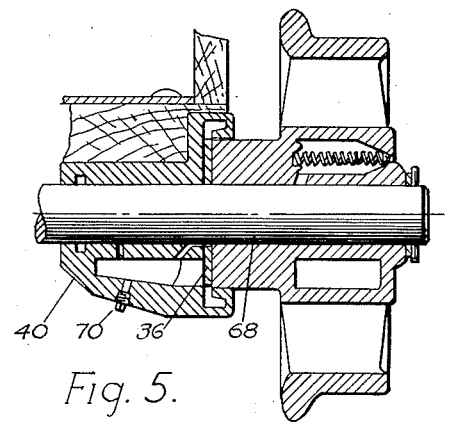
Figure 1:
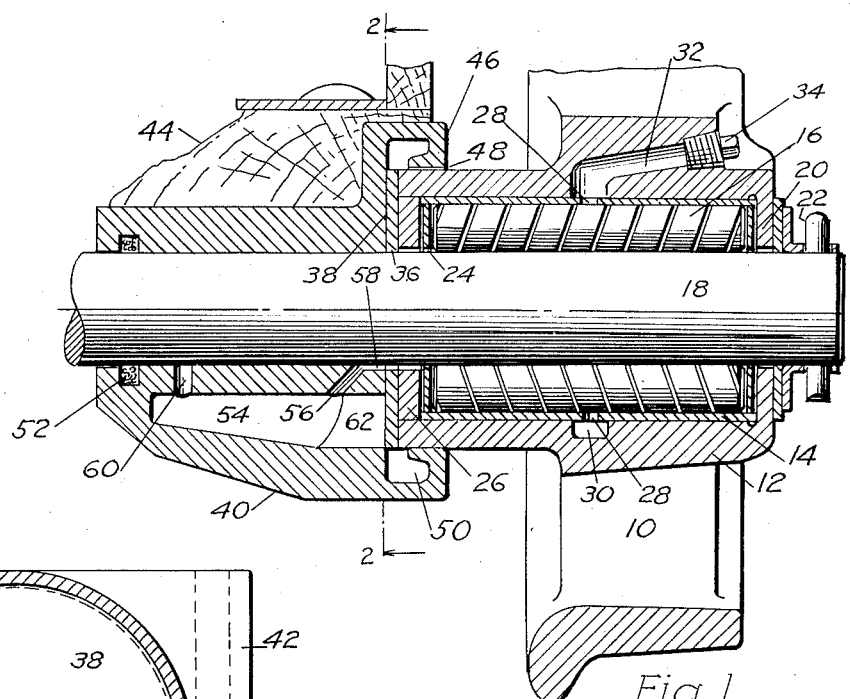
Figure 2:
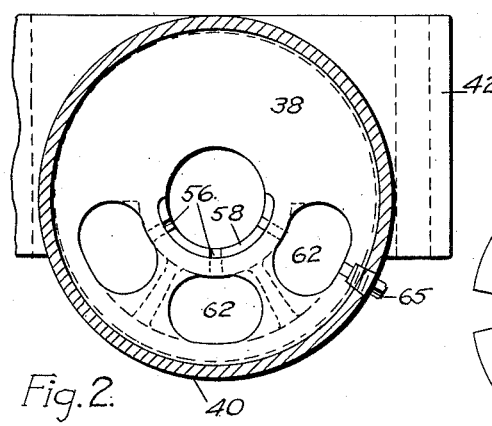
Figure 2 is a section of the journal box detached, on line 2—2 of Figure 1.
Figure 3:
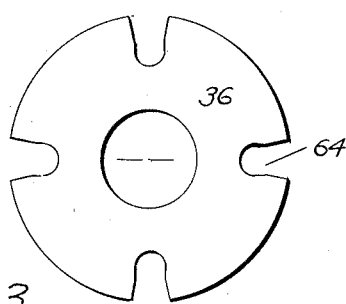
Figure 3 is a side view of a thrust washer.

In Figure 4, another type of wheel is shown wherein the inner end of the hub is substantially closed by the part 66. The end face of this part 66 cooperates with the thrust washer as before and a little clearance is made or left between part 66 and the rotatable axle to allow the lubricant to pass. In Figure 5, the wheel hub has a plain bearing 68 with the axle and, in this case, it may be preferable to introduce lubricant directly into the reservoir after removing a threaded plug 70.

Although the invention has been described by reference to certain specific embodiments, it should be understood that, in its broader aspects, it is not necessarily limited thereto.

I claim:

1. In a device of the character described, in combination, an axle, a wheel hub journalled on the axle and having a thrust face at its inner end, a journal box surrounding the axle and having a thrust face near its outer end, a lubricant reservoir at the bottom of the box at the side of its thrust face, a freely rotatable member supported by the axle between said thrust faces, said member having a flat side face extending across the end of the reservoir and having lubricant receiving and carrying openings in lateral communication with said reservoir, whereby the rotation of the member lifts lubricant from the reservoir and distributes it to the thrust faces; substantially as described.

2. In a device of the character described, in combination, an axle, a wheel hub journalled on the axle and having a thrust face at its inner end, a journal box surrounding the axle and having a thrust face near its outer end, a lubricant reservoir in the bottom of the box at one side of its thrust face, a freely rotatable washer supported by the axle between said thrust faces, said washer having its bore larger than the axle to provide a clearance space for passage of lubricant along the under side of the axle, the washer also having lubricant receiving and carrying openings in communication with said reservoir, whereby, on the rotation of the washer, lubricant is lifted from the reservoir and distributed to the thrust faces and the axle; substantially as described.

3. In a device of the character described, in combination, an axle, a wheel hub journalled on the axle and having a thrust face at its inner end, a journal box surrounding the axle and having a thrust face near its outer end, a lubricant reservoir at the bottom of the box at the side of its thrust face, the box having ports leading from the axle to the reservoir, a freely rotatable washer on the axle between said thrust faces, said washer having a flat side face extending across the end of said reservoir and having a series of openings for successively communicating with the reservoir as the washer rotates, whereby lubricant is lifted from said reservoir and distributed to said thrust faces and the axle; substantially as described.

4. In a device of the character described, in combination, an axle, a wheel hub journalled on the axle and having an end thrust face at its inner end, roller bearings in the hub, said hub having its thrust face clearing the axle to provide a lubricant passage, means for allowing the introduction of a supply of lubricant to the bearings in the hub, a journal box surrounding the axle and having a thrust face near its outer end, a lubricant reservoir in said box at one side of and terminating at said thrust face, a freely rotatable washer loosely surrounding the axle to allow lubricant to pass along the axle from said hub to the reservoir, said washer extending across said reservoir and interposed between the thrust faces of said box and said hub, whereby, in the rotation of the washer, lubricant is lifted from said reservoir and distributed to said thrust faces and returned to said bearings; substantially as described.

5. In a device of the character described, in combination, an axle, a hub journalled on the axle and having a thrust face at its inner end, the thrust face having a clearance with the axle to provide a lubricant passage, means for allowing the introduction of a supply of lubricant to the hub, a journal box surrounding the axle and having a thrust face near its outer end, a lubricant reservoir in said box communicating with the axle, and means for causing a circulation of lubricant between the hub and the reservoir in the journal box, said means comprising a freely rotatable washer supported by the axle and having a bore materially larger than the axle to provide a lubricant passage along the under side of the axle, the side face of the washer communicating with the lubricant reservoir; substantially as described.

In testimony whereof I hereunto affix my signature.

HOWARD K. PORTER.